INVENTORS
Donald E. Robinson
Jack H. Erwin
BY
ATTORNEYS

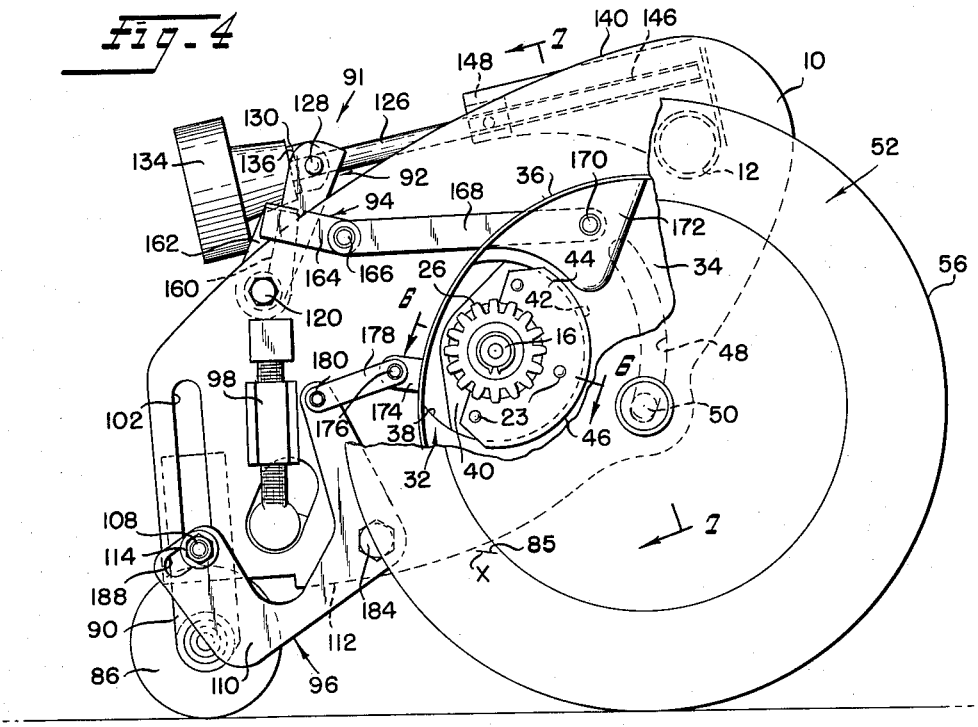
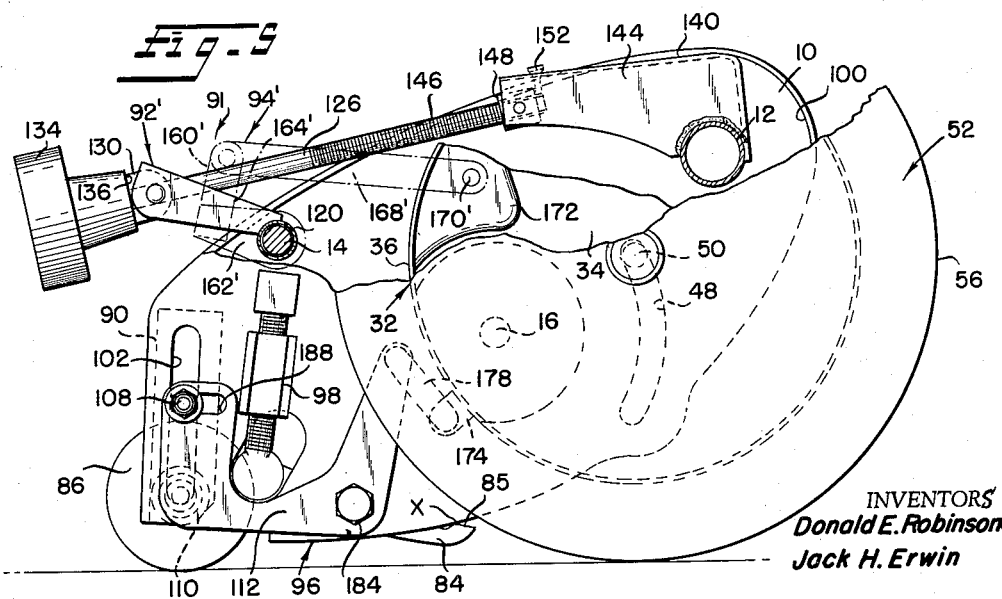

Nov. 16, 1965     D. E. ROBINSON ETAL     3,217,479
COMBINED HEIGHT ADJUSTMENT FOR REEL MOWER
Filed April 29, 1963     4 Sheets-Sheet 4
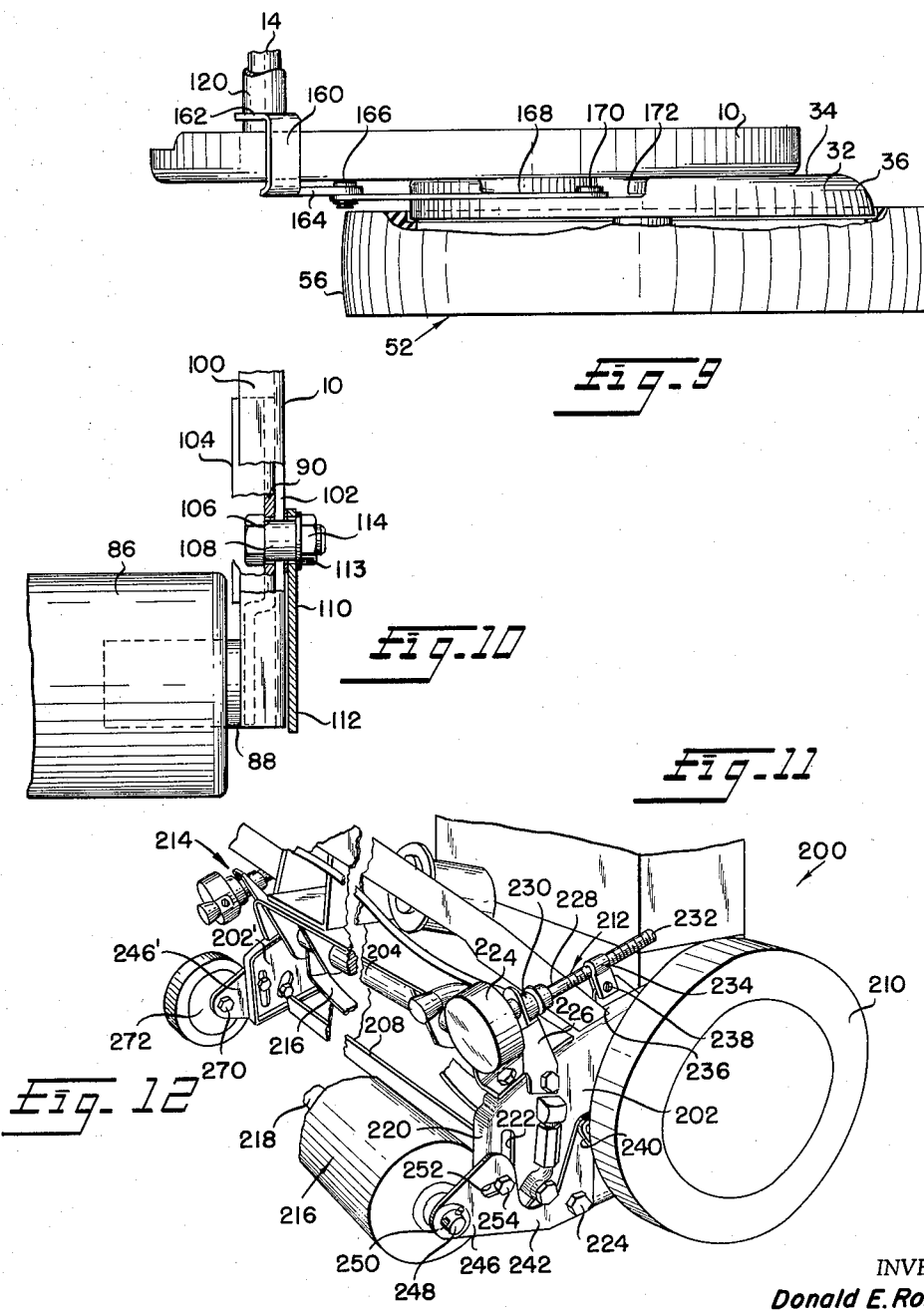
INVENTORS
Donald E. Robinson
Jack H. Erwin
BY
ATTORNEYS

United States Patent Office 3,217,479
Patented Nov. 16, 1965

3,217,479
COMBINED HEIGHT ADJUSTMENT FOR REEL MOWER
Donald E. Robinson and Jack H. Erwin, Marysville, Ohio, assignors to The O. M. Scott & Sons Company, Marysville, Ohio, a corporation of Ohio
Filed Apr. 29, 1963, Ser. No. 276,354
9 Claims. (Cl. 56—254)

This invention relates to lawn mower height adjustment structure particularly adapted, though not limited, to reel type mowers and more specifically relates to concurrent adjustment of the mower wheels and the roller relative to the mower frame, reel and bedknife.

With an increased demand by homeowners for more convenient and versatile implements for use in lawn care, it has become necessary to develop and provide lawn mowers which are capable of being easily adjusted to produce the desired cutting characteristics. An important lawn mower adjustment is that of regulating the height of the cut so that the operator may vary the cutting height in accordance with ground conditions, weather, type of grass being cut and desired lawn texture. There are many previously known devices for adjusting the height of a lawn mower cut shown in the prior art although most such devices require the use of wrenches and accomplish adjustment solely by means of changing the roller position.

Accordingly, a primary object of the present invention resides in the provision of novel, convenient, fast and easily operable lawn mower height cutting adjustment which will rigidly maintain the desired adjustment and yet provide optimum cutting characteristics and ease of mower operation. To such end, adjustment means are provided on both sides of the mower for simultaneous, vertical, variable, correlated positioning of one or more of the drive wheels and the roller relative to the cutting blade reel and bedknife on the supporting frame member. Desirably, connecting means are associated with the adjustment means on both sides of the mower whereby the height of cut of the mower may be vertically changed by means of a single manipulation by the operator.

A further object resides in the provision of novel support structure for adjustably mounting the wheels of a lawn mower to the mower frame, the mounting including quick change lever mechanism with a strong and rigid construction which is easy to produce, economical to manufacture, eliminates the chance of placement errors by the operator, and requires no tools to change and set the cutting height adjustments.

A further object of the invention is to provide novel lawn mower structure wherein mounting members for any mower wheels, including one or more drive wheels, are incrementally adjustable relative to the supporting frame member, and the assembly of the wheel mounting members to the frame structure is rigidly maintained and adjustment is easily accomplished, while maintaining the cutting plane between bedknife and reel blades approximate the optimum cutting angle relative to the upright grass blades to avoid tearing and shredding of the grass plant, and yet the adjustment will not become accidentally displaced, nor will the adjusting mechanism interfere with the turf during travel.

A further object of the present invention is to provide lawn mower structure wherein mounting members for mower wheels, including drive wheels, are adjustably mounted upon the supporting frame member and each wheel is pivotally interconnected by a kinematic linkage to the roller axle at its terminal ends, whereby adjustment of the wheel mounting members relative to the frame member causes concurrent and directionally similar adjustment of the wheels and roller relative to the frame.

Further novel features and other objects of this invention will become apparent from the following detailed description, discussion and the appended claims taken in conjunction with the accompanying drawings showing preferred structure and embodiments, in which:

FIGURE 4 is a side view of the mower seen in FIGURE 1, illustrating the highest cutting adjustment, the handle brackets being omitted and a portion of the drive wheel broke away for clarity;

FIGURE 5 is similar to FIGURE 4, but has an additional upper side portion broken away to illustrate the arrangement of the actuating members, in this instance the height adjustment being set for minimum cut.

FIGURE 9 is a detail plan view illustrating the interrelationship between the right hand reel side plate and the associated drive wheel mounting plate as incorporated on the mower shown in FIGURE 1;

FIGURE 10 is a rear elevation view showing details of the right-hand mower roller adjusting bracket and links as used on the embodiment of FIGURE 1;

Figure 1:
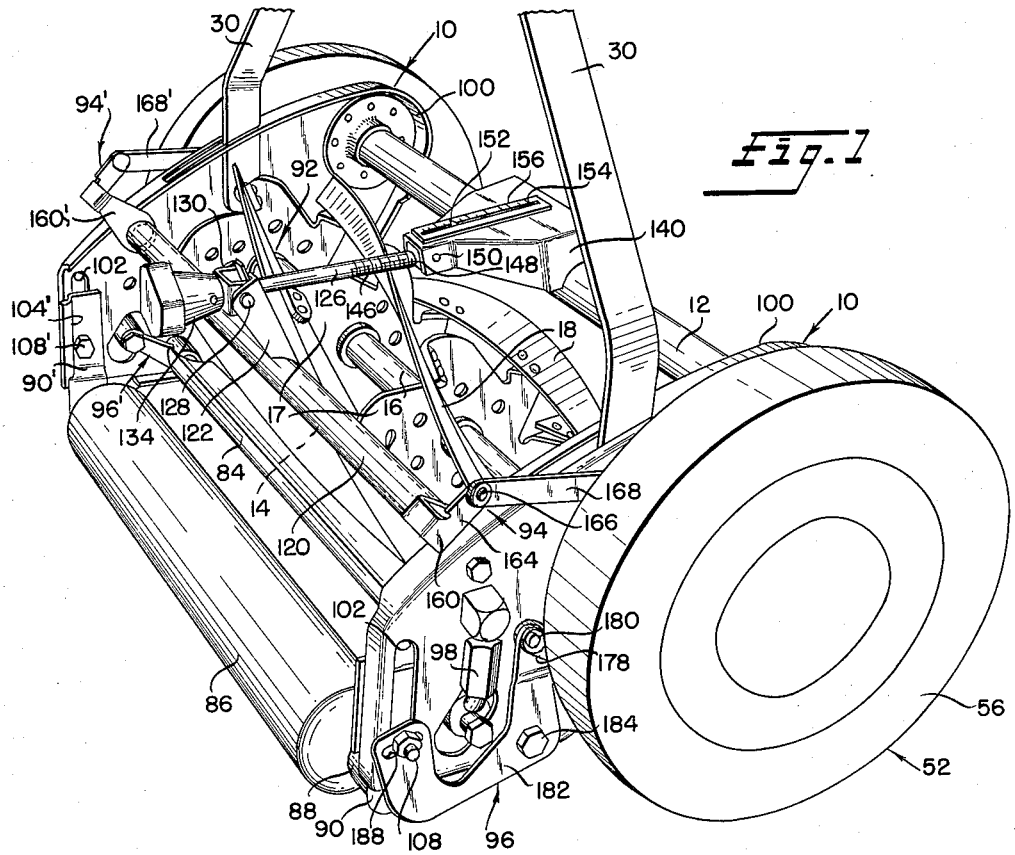
FIGURE 1 is a perspective view of a reel type lawn mower constructed in accord with one embodiment of the present invention.

FIGURE 11 is a perspective view of a second embodiment of the present invention illustrating how independent side, height of cut adjustments can be accomplished, the roller mounting in this instance being somewhat modified from the structure shown in FIGURE 1; and FIGURE 12 is a detail perspective view of the left rear quarter of a modified mower like that shown in FIGURE 11 but showing how small rear wheels can be used in lieu of the roller.

Figure 6:
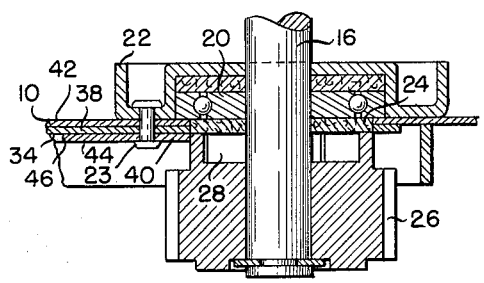
FIGURE 6 is an enlarged detail section, taken along line 6—6 of FIGURE 4, illustrating the reel shaft bearing structure and showing the cooperation of the wheel mounting member journal portion with the frame side member.

FIGURE 1 illustrates the general appearance of a reel type lawn mower incorporating the components of the invention. The lawn mower frame consists of a pair of parallel spaced apart side frame members 10 of generally vertically planar configuration having a substantial portion of their peripheries deflected inwardly to define reinforcing flanges. The two frame members 10 are maintained in a spaced apart rigid relationship by a pair of elongate spacing members 12 and 14 rigidly affixed, as by rivets or staking, to the planar wall of the frame members 10. The elongate member 12 is commonly referred to in the lawn mower art as a shrub bar and may be referred to as such in this specification and the claims. A reel shaft 16 has several spiders 17 which mount a plurality of blades 18, the shaft 16 being rotatably journalled within bearings 20, see FIGURE 6, mounted upon the inside of the frame members within cupped bearing housings 22. The bearing housings are secured to frame 10 by rivets 23, to which further reference will be made hereinafter. The ends of the reel shaft 16 project through openings 24 in the mid portion of the frame members and a pinion 26 is drivingly connected thereto by a unidirectional clutch 28 in the known manner. A handle 30 (FIGURE 1), in a conventional manner is pivotally affixed to the two frame members 10 for pushing and guiding the mover. The above described structure is essentially conventional with this reel type of lawn mower.

Referring to FIGURE 4, both of a right-hand and a left-hand combination plate-like drive wheel support bracket or mounting member 32 are made circular in order to also serve as inner wheel housings. Other than being right and left hand parts, both support brackets have a similar configuration and only one need be described. Each wheel support bracket 32 is rotatably, eccentrically journalled on the outer surface of an associated frame member 10 about the axis of the reel shaft 16. The wheel support brackets 32 are preferably constructed of a steel sheet metal stamping with a generally planar portion 34 having surface engagement with the outer surface of the associated frame member 10. The circular wheel support, also serving as the inner wheel housing, has its periphery flanged at 36 to provide a cylindrical projection receivable within a circular groove in the inner side of the associated drive wheel tire, as clearly shown in FIGURES 7 and 9, serving as a debris, and dust shield for the mower drive gears. Turning back to FIGURE 4, the wheel support 32 is provided with an eccentrically located opening 38 with a partially circular configuration.

Each wheel support 32 is mounted for pivotal shift upon the associated frame member 10 by means of a planar plate segment 40 rigidly secured, by the reel bearing cup rivets 23, against the outer planar surface of the frame member. Segment 40 has a cylindrical sector peripheral surface 42 which substantially corresponds in dimension, though slightly less, to the eccentric circular opening 38 in the wheel supports 32. The cylindrical sector surface 42 of segment 40 constitutes a journal surface concentrically related to the axis of the reel shaft 16. An arcuate plate 44 is so placed over the segment 40, also being rigidly secured by the reel bearing cup rivets 23, whereby a portion of the plate 44 extends radially beyond the cylindrical journal surface 42 of the segment 40 to form a retaining lip 46, also shown in FIGURE 6. For assembling a wheel support 32 on its associated frame 10, the opening 38 in the support 32 will provide sufficient play so that upon initial placement of the support 32 slightly to the right, FIGURE 4, the opening 38 may be slipped over the retaining plate 44 to clear the leftmost edge or the lip 46 of the plate. The wheel support 32 can then be moved to the left into assembled relationship, whereby the peripheral portion of the journal opening 38 in support 32 abuts the mating cylindrical journal surface 42 of segment 40 and will be interposed between the retaining plate lip 46 and the surface of frame member 10, as will be apparent from FIGURE 6. This arrangement eccentrically journals and partially axially retains the wheel support member 32 upon the associated frame member 10 on a large bearing surface concentric with the axis of the reel shaft 16 and pinion 26 mounted thereon. An arcuate slot 48 in each frame member 10 is made coaxial with the reel axis and, as will now be described, through cooperative relationship with wheel stub axles 50, will radially retain the housing support 32 in pivoted disposition on the cylindrical sector 42 of segment 40 and completes the axial retention of the support 32 against the frame 10.

Figure 7:
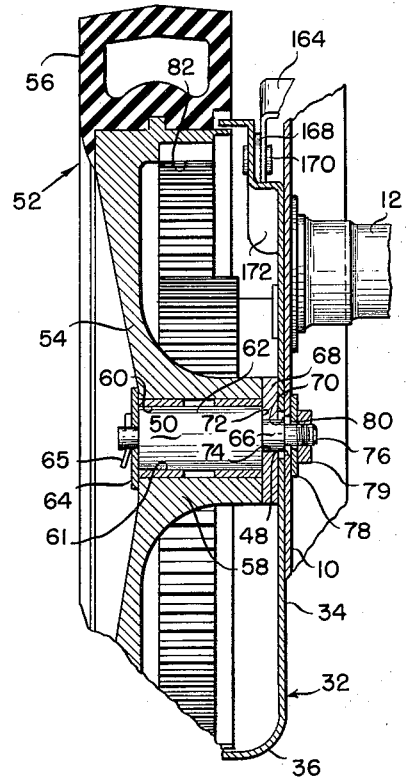
FIGURE 7 is an enlarged detail section taken along line 7—7 of FIGURE 4 with the drive wheel in assembled position.
Figure 8:
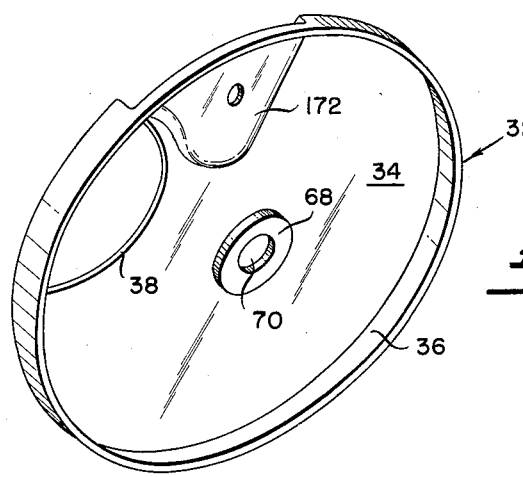
FIGURE 8 is a perspective view of the plate-like wheel support bracket.

The construction of the drive wheels 52 is best illustrated in FIGURES 7 and 9. Each wheel 52 is identical and includes a rimmed hub 54, having a tread member 56 of resilient material affixed to the rim periphery thereof. The hub is provided with a central boss 58 with a through bore 60 by which the wheel is rotatably mounted upon an enlarged journal portion 62 of stub axle member 50. A sleeve bearing 61 may be disposed in the bore 60, if desired. A washer 64 and cotter pin 65 retain the wheel on the axle.

Axle 50 has a stepped cylindrical configuration with a first, reduced radius, splined portion 66 for non-rotatably affixing the axle within the hole which passes through a heavy thrust washer 68, the washer being welded to the center of the planar portion 34 of wheel support 32 with its hole concentric with a hole 70 through the support 32. A shoulder 74 at the end of the splined portion 66, in assembly, is flush with the surface of housing support 32 and will align with slot 48 in the frame member. A further reduced and threaded portion 76 of the axle projects with substantial clearance through the arcuate support slot 48 and provides the terminal end of the axle. A stepped washer bushing 78 is placed over the threaded axle portion 76 and drawn up snug against the shoulder 74 by a nut 79. This relationship holds the axle journal shoulder 72 tight against the heavy washer 68. The reduced bushing projection 80 of washer 78 has a very slightly greater axial dimension than the wall thickness of frame 10 which provides a close sliding radial relationship of the axle 50 in the arcuate frame slot 48, and maintains the wheel support 32 against the frame 10 in a close sliding relationship for the desired pivotal adjustment of the drive wheel support brackets 32 relative to the frame members 10. Note that the axles are fixedly located in the housing support members 32 and cooperate with the sides of the arcuate slot 48 to maintain the housing support member 32 pivotally engaged with the cylindrical journal sector 42 of segments 40 and under the lip of associated retaining plates 44. The close sliding relationship between each wheel housing support member 32 and the associated frame member 10 produced by the fixed relationship of the washer 78 relative to axle shoulder 74 (adjacent the axle journal 62) permits the axle 50 to impose much of its weight bearing forces directly to the frame member.

An internal ring gear 82, secured within or integral with the peripheral rim flange of wheel hub 54, has teeth which mesh with the teeth of the adjacent reel shaft pinion gear 26 and provide a driving connection between the drive wheel and the pinion.

The structure so far described, covers a reel mower and wheel support assembly, the wheel support structure being securely fixed against the side frames but shiftable through a circular path about the reel axis permitted by the length of arcuate slot 48. Additionally, the two side frame members 10 also adjustably support a bedknife 84, the blade edge of which is located under and slightly to the rear of the center of and adjacent the path of the blades 18 of the reel. Also, a rearwardly located ground engaging roller 86 is rotatably supported on stub axles 88 fixed on brackets 90 which are mounted on associated side frame members 10.

The reel mower of this invention, as depicted in FIGURE 1, incorporates a cutting height adjustment mechanism 91 (FIGURES 4 and 5) for accomplishing simultaneous, incremental vertical positioning of both the left-hand and right-hand drive wheels 52 and rear roller 86 relative to the reel and bedknife by manipulation of a single manual operating member. Cutting height adjustment mechanism 91 includes a centrally located adjustable actuating assembly 92, similar left-hand and right-hand interconnecting linkage assemblies 94 and 94' which transfer the operating movements from the actuating assembly 92 to the pivotable wheel mounting brackets 32, and left-hand and right-hand operating linkages 96 connecting between associated, pivotable wheel mounting bracket structure 32 and roller 86 for accomplishing vertical repositioning of the roller 86 simultaneously with vertical repositioning of both drive wheels 52. The limit positions of the wheels and roller are illustrated in FIGURES 4 and 5; FIGURE 4 showing the maximum cutting height of the reel and FIGURE 5 shows the minimum cutting height of the reel.

The edges of the helical blades 18 of the reel scissor across the blade edge 85 of bedknife 84 (FIGURE 1) in a substantially horizontal pass from left to right as is true of most conventional reel mowers. The bedknife 84 may be adjusted by side turnbuckles 98 so the reel blades either just "kiss" the bedknife or miss the bedknife by a minute fraction of an inch, as in the silent reel mowers. The actual bedknife to reel adjustment is not per se a part of the present invention and will not be further described.

In FIGURES 4 and 5 the small heavy arcuate line X represents the blade area where scissoring occurs between the reel blades and the bedknife. In FIGURE 4 the cutting location X is shown at the maximum height of cut. At maximum cutting height, the location where a blade of grass is being cut is furthest from the ground, and accordingly the portion of grass blade being cut off will have a greater freedom of sway than if the cutting location were lower to the ground where the blades of grass is provided with more stiffness by the rest of the grass plant. Therefore, at maximum cutting height it is desirable that the scissoring plane be perpendicular to the blade of grass so that the resulting cut passes squarely through the blade of grass with minimum shredding of the grass blades. It is slightly less important to obtain a perpendicular cut when the mower is set for minimum cutting height. The effect just described can be compared to proper use of ordinary scissors cutting a sheet of paper—if the paper is not held at right angles to the cutting action, the cut will not be clean and in exaggerated instances may not even occur. However, if the paper is more stiff a slight angle of scissoring, away from a right angle cut, can be tolerated. The latter example can be compared with the disposition of the mower cutting location X in FIGURE 5, the low cut, where the cutting angle deviates a few degrees away from a right angle cut. For mechanical and design reasons, to be described hereinafter, the cut action is not accomplished at right angles to the grass blade throughout the adjustment range but is permitted to deviate a slight amount from the optimum right angle cut at the low cut adjustment where deviation can best be tolerated.

The pair of planar vertical frame members 10 or side plates, each have an inwardly facing peripheral flange 100 which extends down along the rear end of the plate. An elongate vertical slot 102 near its rear end cooperates with the roller mounting and adjusting mechanism to permit vertical movement of both ends of the roller 86. In FIGURE 10, roller 86 has its illustrated end rotatably mounted on an associated stub axle 88 of roller bracket 90, the bracket being mounted to permit relative vertical movement adjacent side plate slot 102. The roller bracket 90, has a bent rear lip 104 which slidably guides the bracket along the vertical rear peripheral flange 100 of side plate 10 and is also provided with an aperture 106 receiving therethrough, a shouldered bolt 108 which passes through the side plate slot 102, a suitable spacing washer, one leg 110 of an actuating bell-crank 112, a retaining washer 113, and is secured by nut 114 threaded on its end.

Figure 2:
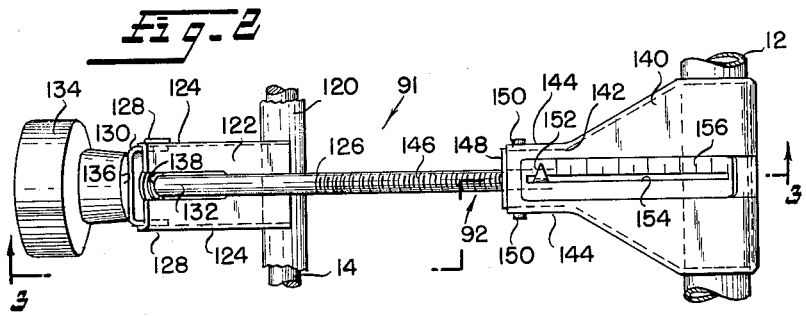
FIGURE 2 is a detail plan view of the actuating control mechanism for the cutting height adjustment linkages shown in FIGURES 1, 4 and 5.
Figure 3:
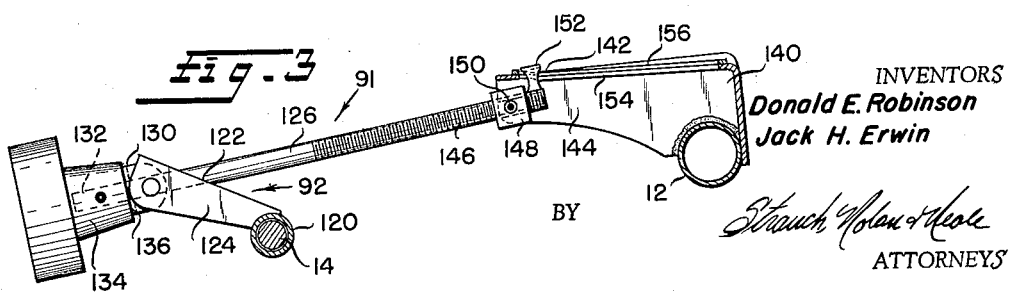
FIGURE 3 is a side view of the actuating control mechanism seen in FIGURE 2.

The mower cutting height adjustment mechanism 90 (FIGURES 1, 2 and 3) connects between and is supported by the mower frame spacing tube 12 and spacing rod 14. Adjustment mechanism 90 consists of a rotatable tube 120, fitted over the spacing rod 14, the adjustable linkage 92 connected to the forward space tube 12 and operating linkages 94 and 94' connected to each wheel support bracket 32.

The adjustable linkage 92 includes a lever arm 122 rigidly secured, as by welding, to the center of rotatable tube 120. Lever arm 122 has apertured side flanges 124 and its extended end is forked to permit free passage of an adjusting screw rod 126. Secured to and between apertured side flanges 124, by rivet pivot pins 128 through the flange apertures, is a small U-shaped bracket 130, the bight of which is apertured and enables through passage of the adjusting screw rod 126. A manual operating knob 134 is fixedly secured on the end 132 of the rod by a small roll pin and has its base 136 abutted against the surface of the U-bracket. A washer on rod 126 and a spring clip 138 (FIGURE 2) is an annular groove in the rod are disposed on the inside of the U-bracket 130 and, with the fixed knob 134 on the other side, axially fix the rod 126 relative to the U-bracket.

A channel shaped trunnion bracket 140, fixed, by welding, to the spacing tube 12 immediately in front of the lever arm 122, has a rearwardly extended portion 142 with depending side flanges 144 which form an open bottom housing permitting extension of the threaded end 146 of the adjusting rod 126. Rod 126 is threaded into a trunnion nut 148 which is pivotally swung by side pins 150 disposed in holes in the side flanges 144 of trunnion bracket 140.

Fixed on the terminal end of threaded rod portion 146 is an upstanding pointer 152 with a bent marker tip projected through an elongate fore and aft slot 154 formed in the top wall of the trunnion bracket 140. The pointer moves along a scale 156 as the screw rod 126 is turned in the trunnion nut 148 and, by utilizing predetermined markings, will indicate the height of cut for all adjustment positions.

When the adjusting screw 126 is turned into trunnion nut 148 the lever arm 122 will be swung clockwise as seen in FIGURES 4 and 5 and when turned in the opposite direction, lever arm 122 will be swung counterclockwise. Inasmuch as operating tube 120 is fixed to lever arm 122 it will be rotated coincident with movement of the lever arm.

The right-hand and left-hand linkage assemblies 94 and 94' which interconnect the actuating assembly 92 to the shiftable wheel brackets are similar and, with reference to FIGURES 4 and 5, only the right-hand one 94 will be described although the other assembly 94' is referenced by prime numbers. Assembly 94 includes a laterally offset dog leg lever 160 with its base arm 162 fixedly secured, as by welding, to the associated end of rotatable tube 120 and its offset arm 164 disposed on the outer side of the associated frame side plate 10. The free end of offset lever arm 164 is connected by a pivot pin 166 to one end of a connecting link 168 which extends forward along the frame side plate 10 and is pivotally connected by a pivot pin 170 to the associated wheel support bracket 32.

Actuation of linkage assemblies 94 and 94' produces rotation of both of the wheel support brackets to vertically alter the position of the drive wheels 52 with respect to the reel, and bedknife. To perfect ease of pivoting about an axis which is offset from the center of the wheel support bracket, and still maintain a compact assembly, the wheel support bracket 32 is provided with a stamped recess 172 to provide clearance and prevent blockage or binding between wheel bracket 32 and link 168.

A short lever arm 174, welded to the peripheral flange 36 of each wheel bracket 32, is interconnected to the mower roller 86 by operating linkage assemblies 96 and 96'. Again, mechanisms on both sides are similar and each assembly includes a plurality of pivotable links (best shown in FIGURES 4 and 5). The short lever arm 174 is pivotally connected by pin 176 to a connecting link 178, the other end of which is pivotally connected by pin 180 to the aforedescribed bell-crank operating lever 112. In response to pivotal shift of wheel bracket 32, bell-crank 112 pivots on a shouldered bolt 184, causing the rearmost bell-crank arm 110 to swing up or down relative to frame side plate 10. The end of bell-crank arm is slotted at 188, slot 188 cooperating with shouldered bolt 108 (FIGURE 10) which, in combination with nut 114, maintains bell-crank leg 110 in position and permits the leg to slide along the bolt 108 as the bolt is shifted along slot 102 to raise the roller brackets 90 and 90' (compare FIGURES 2 and 3).

In operation, assuming the reel mower is in the cutting position shown in FIGURE 4, namely, in its uppermost cutting position, the operator, to decrease the cutting height to, for example, the position shown in FIGURE 5, would rotate knob 134 counterclockwise and rotation of threaded end 146 of rod 126 in trunnion nut 148 causes the rod 126 to move in a leftward direction as viewed in FIGURE 4. Pointer 152 will travel along the scale 156 with the terminal end of rod 126 and provide an indication to the operator of the new cutting height adjustment. Leftward movement of rod 126 will force the spring clip 138 and washer against the U-shaped bracket 130, forcing the lever arm 122 to rotate the tubular sleeve 120 in a counterclockwise direction as view in FIGURE 4. Counterclockwise rotation of tubular sleeve 120 concurrently rotates both dog-leg levers 160 and 160' drawing links 126 and 126' leftward toward the position shown in FIGURE 5. This leftward movement of link 126, 126' in turn causes rotation of both wheel support brackets 32 coaxial to the reel axis thus lowering the frame, reel and bedknife.

Rotation or pivotal swinging of both wheel brackets in this case is counterclockwise and consequently the short wheel bracket lever arm 174 moves downwardly from the position shown in FIGURE 4 toward that shown in FIGURE 5. Short lever arm 174 pivotally draws the link 178 downwardly which, in turn, rotates the roller operating bell-crank 112 clockwise about shoulder bolt 184 resulting in vertical sliding movement of the roller bracket shouldered bolt 108 in cross slots 102 and 188. This movement occurs on both sides of the mower and is effective to drop the rear ends of the frame side plates 10 with respect to roller 86, to a position closer to the ground while at the same time preventing the bell-crank 112 from interference with the turf. In one commercial manifestation of the present invention, the maximum cutting height of the reel and bedknife, as shown in FIGURE 4, is approximately 2½ inches and the minimum cutting height, as shown in FIGURE 5, is approximately 9/16 inch.

*Second embodiment*

FIGURE 11 illustrates a reel mower embodiment with height adjustment made concurrently through wheels and roller in a manner similar to that of the first embodiment excepting that each side of the mower is adjusted independently rather than by a unitary operator and the connecting linkage to the roller is modified.

The illustrated mower is a battery driven electric power mower, a mower organization which inherently presents problems not present in hand reel mowers. Batteries, which are currently considered satisfactory for battery driven mowers, are of lead-acid design in the majority of cases, making it necessary that the battery be kept reasonably level to prevent spillage of fluid. Furthermore, the comparatively high weight factor of such a battery, which can represent 50% of total mower weight, causes changes in chassis angle to make considerable difference in weight distribution on wheels and roller. Tests have proved that a distinct loss of power occurs with any appreciable weight loading on roller and, in a battery powered self-propelled design, loss of traction will result at drive wheels.

To keep the battery level, various means were considered, some methods might be self leveling and could depend upon gravity, or another method might involve linkage from the height adjustment system to a battery mount. However, the best solution was considered to be the one which also solved the problem of keeping the bedknife level, that is, mechanism in which wheels and roller would adjust simultaneously without causing appreciable change in chassis angle.

In FIGURE 11, the power-driven reel mower 200 has frame structure with side plates 202 and 202' and spacer members such as tube 204, similar to but desirably heavier than the first described embodiment, the frame rigidly supporting a cutting reel 206 and maintaining the bedknife 208 substantially horizontal adjacent the reel. Each of the two drive wheels, typified by drive wheel 210, have pivot support brackets (not shown but similar to brackets 32) connecting the drive wheels with the fixed side frame plates 202 for pivotal height adjustment about the reel axis. Reel mower 200 has a pair of cutting height adjustment mechanisms 212 and 214 for independent vertical incremental positioning of each drive wheel and an associated side of the roller assembly 216 relative to the reel axis and, of course, the bedknife. Mower cutting height adjustment mechanism 212 is connected to the right-hand wheel support bracket (not shown) through an upper interconnecting linkage assembly to provide adjustable control of the right-hand wheel by pivoting the wheel support about the reel axis. A lower interconnecting linkage assembly connects the pivotable wheel support to one end of the roller axle 218 to allow simultaneous vertical positioning of one side of the roller assembly 216 concurrent with vertical positioning of the associated drive wheel 210. The left-hand mechanism will be identical, except that it is left-hand.

Frame side plates 202 and 202' each have inwardly facing flanges and a vertical slot 222 adjacent its rear end to vertically guide the up and down movement of one side of the roller assembly 216 during height adjustment. Adjacent the frame side plate 202 is the wheel support which pivotally, cooperates there with and journals the drive wheel 210. By pivoting the wheel support with respect to frame side plate 202, about the reel axis, the cutting position of reel 206 is raised or lowered and at the same time, the interconnecting linkage between wheel support and roller assembly results in the raising or lowering of roller assembly 216.

Mower cutting height adjustment mechanism 212 is actuated by a manual knob 224 which is rotatably mounted on a bracket 226 secured on side plate 202. The knob 224 is non-rotatably fixed on the end of a threaded rod 228 which passes through bracket 226, being axially maintained relative to the bracket by the knob 224 and a collar 230, but having freedom for a slight universal tilting movement to accommodate the adjustment range.

The forward threaded end 232 of rod 228 is threaded into a threaded bracket fitting 234 which in turn is pivotally connected to one end of a lever 236 by pin 238. The lever 236 is rigidly connected to the right wheel support (not shown). Also rigidly attached to the right wheel support is a short lever arm (not shown), similar to lever 174 in FIGURE 4, which is pivotally connected to connecting link 240. Link 240 is connected by a pivot pin 242 to one arm of a bell-crank 242 which in turn is pivotally mounted on a shoudered bolt 244 fixed in frame side plate 202. This rotary movement of the bell-crank 242 swings its other arm 246 to raise or lower one side of roller assembly 216. The right-hand roller axle end 248 projects through an aperture 250 in bell-crank arm 246, which includes a slot 252 fitted over the shouldered sliding bolt 254 and which interlocks slots 222 and 252 to provide lateral rigidity to the bell-cranks. The left-hand mechanism is constructed of similar components and has a similar combined height adjustment action on the left wheel and left end of the roller axle.

In both embodiments it will be seen that the bell-crank link which is connected to the roller has a deep cut-out on the upper edge of the rear arm. That configuration was found to be necessary to avoid interference with the bedknife independent adjustment linkage. On some mowers which may not have the bedknife adjustment in the same or similar location such a cut-out in the bell-crank arm can be eliminated. In a battery powered reel mower, of course a single adjustment control can be used in the FIGURE 1 embodiment and moreover, the control could be motor operated rather than manual, if so desired.

It is to be understood that smaller wheels may be used in lieu of the roller shown in both of FIGURES 1 and 11. For example, in FIGURE 12 the left hand bell-crank end 246', actuated by an adjusting mechanism 214, similar to mechanism 212 shown in FIGURE 11, is provided with a fixed stub axle 270 upon which is rotatably journalled a small wide tired trailing wheel 272, illustrating one way of using trailing wheels. The right-hand bell-crank would, in such case, also be provided with a stub axle to mount a second trailing wheel.

From the foregoing description it will be appreciated that the invention is directed to adjustment features of lawn mowers which are economical to manufacture, may be easily operated by unskilled persons without requiring special tools, and that a rugged and substantial lawn mower construction is possible without need of expensive castings and the like.

The invention may be embodied in other specific forms without departing from the spirit or essential characteristics thereof. The present embodiments are therefore to be considered in all respects as illustrative and non-restrictive, the scope of the invention being indicated by the appended claims rather than by the foregoing description, and all changes which come within the meaning and range of equivalency of the claims are therefore intended to be embraced therein.

What is desired to be claimed by Letters Patent is:

1. A reel mower having a frame member supporting a reel and adjacent bedknife, said reel and said bedknife having a cutting area substantially parallel to the surface of the ground at the point of cut under all mowing conditions, ground engaging mower support and drive means, ground engaging rear support means, and mower cutting height adjustment means including means interconnecting said support and drive means with said rear support means and control means structurally separate from said interconnecting means and connected to said support and drive means to therethrough actuate said interconnecting means to provide joint simultaneous vertical incremental positioning of at least one side of one said drive means and at least one side of said rear support means with respect to said reel.

2. A reel mower as defined in claim 1 wherein said frame member has at least two substantially planar side members mounted thereto and wherein said support and drive means has at least two substantially planar mounting members, each being substantially parallel with and mounted for pivotal cooperation, solely on the adjacent respective one of said side members.

3. A reel mower having: frame means including a front, transversely disposed shrub bar; a reel and adjacent bedknife supported in said frame means; ground engaging support and drive means on said frame means; ground engaging rear support means on said frame means; and mower cutting height adjustment means on said frame means including means interconnecting said support and drive means with said rear support means and control means connected to said support and drive means to actuate said interconnecting means to permit correlative joint dependent positioning of at least one side of said rear support means and at least a portion of said support and drive means with respect to said reel; said interconnecting means including a bell-crank interconnecting said support means with said frame means and means pivotally mounting said bell-crank to said frame means on an axis parallel with the axis of said reel; and said bell-crank and frame means, in combination, comprise a duel slot, cam connection to said rear support means for imparting adjustment movements to said rear support means.

4. A reel mower having: frame means including a front, transversely disposed shrub bar; a reel and adjacent bedknife supported in said frame means; ground engaging support and drive means on said frame means; ground engaging rear support means on said frame means; and mower cutting height adjustment means on said frame means including means interconnecting said support and drive means with said rear support means and control means connected to said support and drive means to actuate said interconnecting means to permit correlative joint dependent positioning of at least one side of said rear support means and at least a portion of said support and drive means with respect to said reel; said frame means having at least a pair of substantially vertical and parallel planar side members and a transverse bracing rod between said side members; said drive means has at least two substantially planar mounting members, each being substantially parallel with and mounted for pivoted cooperation solely on an adjacent one of said side members; and said control means comprises adjustable means pivotally mounted on said bracing rod and kinematic linkage means interconnecting said pivotable adjustable means directly to said mounting members and structurally independent of said means interconnecting the two support means, whereby upon actuating said control means, joint incremental adjustment of said support and drive means and said rear support means relative to said reel and bedknife may be simultaneously obtained.

5. A reel mower as defined in claim 4 wherein said adjustable mounting means includes a cooperating screw and trunnion control assembly and gauge means correlated to the cutting height of said mower.

6. The reel mower of claim 4 wherein each said mounting member has a recessed portion therein overlying the adjacent side member to embrace and enable adjustment range travel of said kinematic linkage means without interference from said mounting member.

7. A reel mower having: frame means comprising at least two substantially planar outwardly facing, spaced apart parallel side members and a transverse bracing rod connected between said side members; a reel and adjacent bedknife supported between said side members, said reel and said bedknife having a cutting area substantially parallel to the surface of the ground at the point of cut under all mowing conditions; ground engaging mower support and drive means comprising at least two substantially planar, mounting members, each being substantially parallel with and mounted for pivotal cooperation, solely on the adjacent said outwardly facing side member; ground engaging rear support means and mower cutting height adjustment means including means interconnecting said support and drive means with said rear support means; and control means connected to said support and drive means to therethrough actuate said interconnecting means to provide joint simultaneous vertical incremental positioning of at least one side of one said drive means and at least one side of said rear support means with respect to said reel; said control means including adjustable mounting means pivotally mounted on said bracing rod and kinematic linkage means interconnecting said adjustable mounting means with the adjacent said mounting member, and wherein each mounting member has a recessed portion therein overlying said associated side member to enable noninterfering travel of said kinematic linkage means.

8. A reel mower having: rigid frame means comprising a pair of substantially planar spaced apart parallel side members and a front, transversely disposed shrub bar connected between said side members, a reel and an adjacent bedknife supported in said frame means; ground engaging support and drive means on said frame means comprising two substantially panar mounting members, each being substantially parallel with and mounted for pivoted cooperation solely on the side of a respective adjacent one of said side members; ground engaging rear support means on said frame means; and mower cutting height adjustment means on said frame means including means interconnecting said support and drive means with said rear support means, and control means connected to said support and drive means to actuate said interconnecting means to permit correlative joint dependent positioning of at least one side of said rear support means and at least a portion of said support and drive means with respect to said reel.

9. A reel mower as defined in claim 1 wherein said ground engaging mower support and drive means comprise rotatably mounted support and drive wheels and means mounting each wheel on said frame means with the wheel axes eccentric to the axis of said reel; and said ground engaging rear support means comprises a rotatably mounted roller and adjustable brace means interconnecting said roller with said frames.

References Cited by the Examiner

UNITED STATES PATENTS

| | | | |
|---|---|---|---|
| 2,197,264 | 4/1940 | Cooper | 56—254 |
| 2,340,849 | 2/1944 | Wildeboor et al. | 56—249 |
| 2,624,168 | 1/1953 | Clemson | 56—249 |

ANTONIO F. GUIDA, *Acting Primary Examiner.*

CARL W. ROBINSON, T. GRAHAM CRAVER,
*Examiners.*